United States Patent
Watanabe et al.

(10) Patent No.: US 7,747,961 B2
(45) Date of Patent: Jun. 29, 2010

(54) DISPLAY DEVICE, USER INTERFACE, AND METHOD FOR PROVIDING MENUS

(75) Inventors: Shinji Watanabe, Iwaki (JP); Satoshi Ishida, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 582 days.

(21) Appl. No.: 11/670,049

(22) Filed: Feb. 1, 2007

(65) Prior Publication Data
US 2007/0182721 A1 Aug. 9, 2007

(30) Foreign Application Priority Data
Feb. 6, 2006 (JP) ............................ 2006-028047

(51) Int. Cl.
G06F 15/00 (2006.01)
G06F 13/00 (2006.01)
(52) U.S. Cl. .......................................... 715/773; 345/4
(58) Field of Classification Search ................. 715/700, 715/763, 765, 851, 853, 773, 786, 830, 764, 715/761; 345/173, 4, 581
See application file for complete search history.

(56) References Cited

U.S. PATENT DOCUMENTS

| | | | |
|---|---|---|---|
| 2003/0006892 A1* | 1/2003 | Church | 340/439 |
| 2006/0066507 A1* | 3/2006 | Yanagisawa | 345/7 |
| 2007/0013624 A1* | 1/2007 | Bourhill | 345/84 |
| 2007/0262953 A1* | 11/2007 | Zackschewski | 345/156 |
| 2008/0129684 A1* | 6/2008 | Adams et al. | 345/156 |

FOREIGN PATENT DOCUMENTS

JP  2005-071286  7/2005

* cited by examiner

*Primary Examiner*—Cao (Kevin) Nguyen
(74) *Attorney, Agent, or Firm*—Brinks Hofer Gilson & Lione (57) ABSTRACT

A display device may include a display unit, a touch detecting unit that detects a touch on the display unit, a touch-position detecting unit that detects a touch position on the touch detecting unit and outputs coordinate data of the position, a display control unit that causes the display unit to provide dual view display of an image and display a menu image, a menu generating unit that generates first and second top menus, and a control unit that performs control to display the top menus in different positions on a screen of the display unit, to determine, on the basis of the coordinate data from the touch-position detecting unit, which of the top menus has been touched, to enable operations on one of the top menus that has been touched, and to disable operations on the other one of the top menus.

16 Claims, 8 Drawing Sheets

DISPLAY DEVICE, USER INTERFACE, AND METHOD FOR PROVIDING MENUS

RELATED APPLICATIONS

The present application claims priority to Japanese Patent Application Ser. No. 2006-28047, filed Feb. 6, 2006, the entirety of which is hereby incorporated by reference.

BACKGROUND OF THE INVENTION

1. Field of the Invention

The present invention relates to display devices, user interfaces of the display devices, and methods for providing menus on the display devices. In particular, the present invention relates to a display device, a user interface of the display device, and a method for providing menus on the display device that can be suitably used for a user interface related to the manipulation of menus of what is called a dual view display configured so that different images can be viewed on one display screen from different viewing directions.

2. Description of the Related Art

Dual view displays configured so that different images can be viewed on one display screen from different viewing directions are known (see for example, see Japanese Unexamined Patent Application Publication No. 2005-71286). For example, when a dual view display is used as an in-vehicle display device of a car navigation system, navigation information can be displayed on the side of a driver, and television images, digital versatile disk (DVD) images, and the like can be displayed on the side of a passenger.

Figure 8:
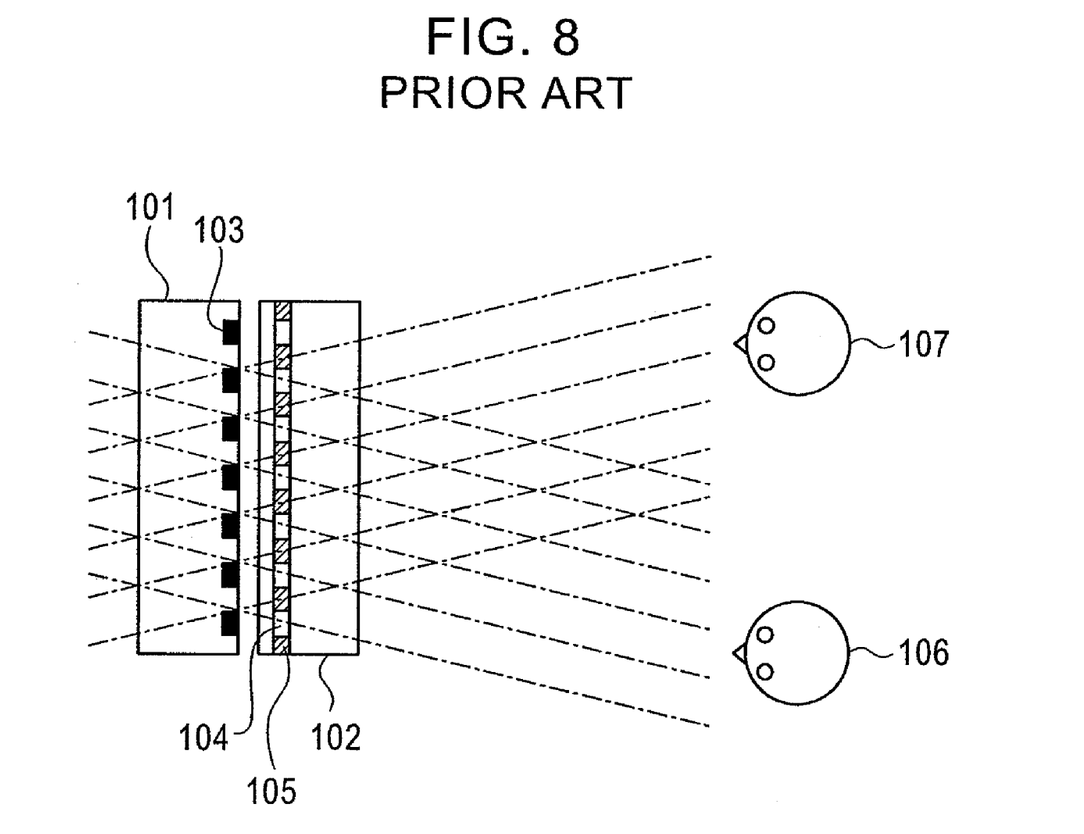
FIG. 8 shows the principle of a dual view display.

Methods for implementing dual view displays include methods using parallax barriers and methods using lenticular lenses. FIG. 8 shows the principle of a dual view display using parallax barriers. The dual view display includes a combination of a switch liquid crystal 101 and a thin film transistor (TFT) liquid crystal 102, as shown in FIG. 8.

A plurality of optical parallax barriers 103 is provided at regular intervals in the switch liquid crystal 101. The parallax barriers 103 control the traveling directions of light beams (backlight for the liquid crystal) so as to separate the light beams into different light beams that reach a left-side viewing position 106 and a right-side viewing position 107. In the TFT liquid crystal 102, an image for the left side and an image for the right side are respectively displayed on a pixel group 104 for the left side and a pixel group 105 for the right side disposed alternately.

Light beams that pass through the parallax barriers 103 and the pixel group 104 reach the left-side viewing position 106, and light beams that pass through the parallax barriers 103 and the pixel group 105 reach the right-side viewing position 107. In this arrangement, different images can be viewed on a display screen of the TFT liquid crystal 102 from different viewing directions.

In some devices in which liquid crystal display panels are used, images displayed on the liquid crystal display panels can be controlled by manipulating not only remote controllers but also touch panels. A touch panel is attached on the front face of a liquid crystal display panel, and operation control by touch can performed by touching a bar, a key switch, or the like, corresponding to a command to select an operation displayed on the liquid crystal display panel.

A touch panel is applicable to the aforementioned dual view display. However, in this case, in addition to a function of displaying separate images on the left and right sides, which characterizes the dual view display, a function of enabling a driver and a passenger to independently perform operations on images displayed individually for them is required. Moreover, a function of determining which of a driver and a passenger has touched the touch panel and adapting the operation of the touch panel to images viewed by the driver or the passenger is also required.

In this case, a method may be adopted, in which a switch for adapting the operation of the touch panel to images viewed by a driver or a passenger, is provided in the main unit to enable the operation of the touch panel by either the driver or the passenger. However, in such a method, since the switch needs to be operated every time a driver or a passenger performs the operation of the touch panel, the operation is complicated.

Moreover, another method may be adopted, in which a sensor that detects the motion of an object is provided at a predetermined place in a vehicle cabin to detect from which of the driver's seat side and the passenger's seat side the touch panel is operated, and it is determined, on the basis of the result of the detection, which of a driver and a passenger has touched the touch panel. However, in such a method, special techniques, such as those implementing a sensor, need to be used, thereby increasing the costs.

In view of the aforementioned problems, in a dual view display described in Japanese Unexamined Patent Application Publication No. 2005-71286, an arrangement is provided to readily and reliably determine which image a touch operation is directed to. In this dual view display, a first touch area is dedicated to a viewer A and a second touch area is dedicated to a viewer B on the touch panel. It is then determined which of these touch areas has been touched, and an operation menu for controlling images corresponding to the touch area, which has been touched, is displayed. However, in the technique described in Japanese Unexamined Patent Application Publication No. 2005-71286, the touch panel needs to be touched once to display the operation menu. Thus, an unnecessary, cumbersome touch operation needs to be performed first.

SUMMARY OF THE INVENTION

The present invention addresses the aforementioned problems. Accordingly, it is an object of the present invention to provide a simplified operation on images that are independently displayed on the left and right sides in a dual view display.

To address the aforementioned problems, a display device includes a display unit that can provide dual view display of an image, a touch detecting unit that detects a touch operation on the display unit, a touch-position detecting unit that detects a position of a touch on the touch detecting unit and outputs coordinate data of the position, a display control unit that causes the display unit to provide dual view display of an image and display a menu image, a menu generating unit that generates first and second top menus for independently performing operations on a plurality of images subjected to dual view display, each of the first and second top menus including a plurality of operational items, and a control unit that performs control to display the first and second top menus in different positions on a screen of the display unit, to determine, on the basis of the coordinate data from the touch-position detecting unit, which of the first and second top menus has been touched, to enable operations on one of the first and second top menus that has been touched, and to disable operations on the other one of the first and second top menus that has not been touched.

It is determined, on the basis of the coordinate data of a touch position, on which of the top menus an operation has been performed. Further, operations on one of the top menus that has not been touched are disabled. Thus, a special technique using a sensor, need not be used, and independent operations by a passenger and a driver can be achieved at a low cost. Moreover, since the first and second top menus are displayed in advance, it is not necessary to perform a touch operation to display the top menus. Moreover, since each of the top menus includes a plurality of operational items, a desired function may be performed by the touch of a corresponding operational item. Thus, the menu operation can be performed by a smaller number of touches.

The present invention is suitable to a dual view display configured so that different images can be viewed on one display screen from different viewing directions.

DESCRIPTION OF THE PREFERRED EMBODIMENTS

First Embodiment

Figure 1:
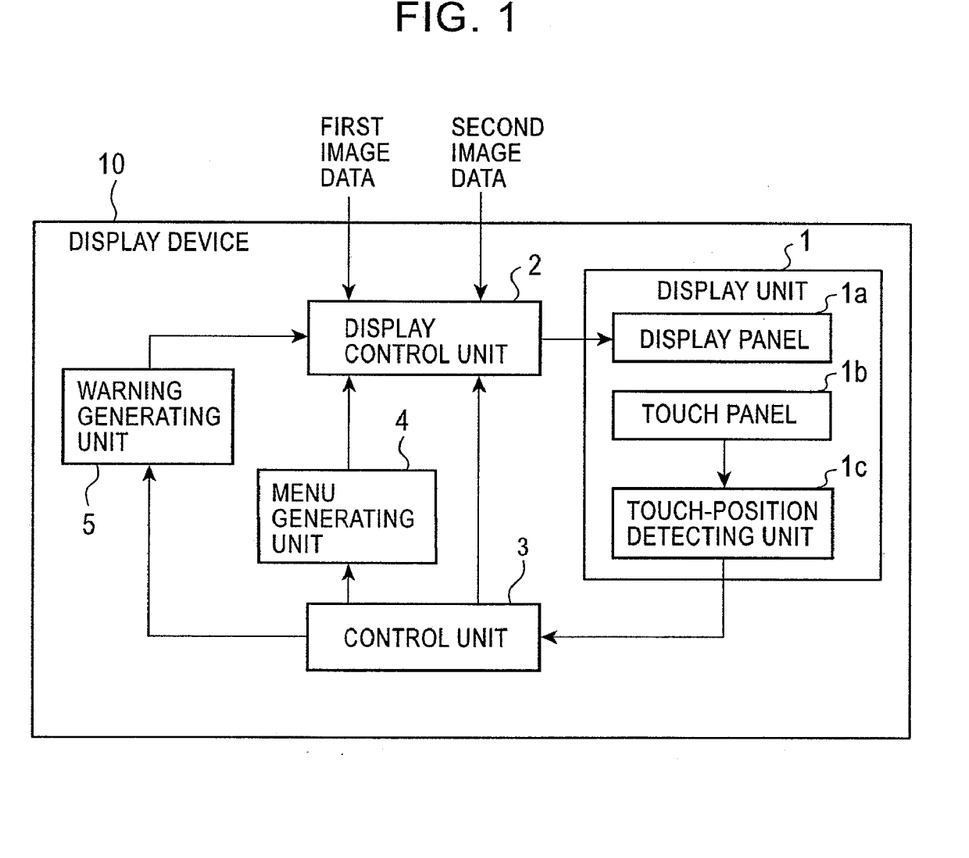
FIG. 1 shows the structure of an exemplary display device according to a first embodiment.

FIG. 1 shows the structure of an exemplary display device. A display device 10 according to the first embodiment may include a display unit 1, a display control unit 2, a control unit 3, a menu generating-unit 4, and a warning generating unit 5, as shown in FIG. 1. The display unit 1 includes a display panel 1a (corresponding to a display unit according to the present invention), a touch panel 1b (corresponding to a touch detecting unit according to the present invention), and a touch-position detecting unit 1c.

The display panel 1a displays an image on the basis of image data. The display panel 1a may have, for example, the configuration shown in FIG. 8 and can provide dual view display of images. In dual view display, a plurality of images based on first image data and second image data can be separately displayed on the left and right sides on the display panel 1a, so that a driver and a passenger can view different images. Moreover, a plurality of images based on either the first image data or the second image data can be separately displayed on the left and right sides on the display panel 1a, so that a driver and a passenger can view the same image.

For example, when the right-side seat is a driver's seat, a navigation image can be displayed on the side of the driver's seat and a DVD image can be displayed on the side of the passenger's seat. The navigation image is displayed on the side of the driver's seat by selecting map image data as the first image data and outputting the map image data to pixel group 105. The DVD image is displayed on the side of the passenger's seat by selecting DVD image data as the second image data and outputting the DVD image data to pixel group 104. Moreover, the same navigation image can be displayed on the side of the driver's seat and the side of the passenger's seat by selecting the same map image data as an image source for the side of the driver's seat and the side of the passenger's seat and outputting the same map image data to the pixel group 104 and the pixel group 105. It can be determined by a driver and a passenger in a passenger's seat operating a source-selecting switch (not shown) which of the image sources is selected for the side of the driver's seat and the side of the passenger's seat.

The touch panel 1b is attached to the front face of the display panel 1a and detects a touch operation by a user (a driver or a passenger in a passenger's seat). For example, a resistive film or infrared light is used to detect the user's touch on the touch panel 1b. The touch-position detecting unit 1c detects the position of the user's touch on the touch panel 1b and outputs the coordinate data.

The display control unit 2 controls the display of images on the display panel 1a. The aforementioned first image data and second image data are input to the display control unit 2, and the display control unit 2 provides dual view display of images on the display panel 1a on the basis of these pieces of input image data. It is assumed that the first image data is map image data for a navigation apparatus. The second image data may be, for example, received television image data or image data from a source that is a playback apparatus for playing back, for example, a video, a compact disk (CD), or a DVD.

Moreover, the display control unit 2 superimposes an image based on menu image data generated by the menu generating unit 4 on the aforementioned images and displays the superimposed images on the display panel 1a, or displays a predetermined menu image on the display panel 1a separately from the aforementioned images. The menu generating unit 4 stores menu image data that contains various types of operational item in a hierarchical format. The menu generating unit 4 generates a menu image from the menu image data and supplies the menu image to the display control unit 2.

The control unit 3 performs overall control of the display device 10. For example, the control unit 3 controls the display control unit 2 so as to provide dual view display of images on the display panel 1a. Moreover, the control unit 3 controls the display control unit 2 and the menu generating unit 4 so as to display a predetermined menu image on the display panel 1a. In the first embodiment, the control unit 3 performs control so that first and second top menus for independently performing operations on different image sources subjected to dual view display are displayed in predetermined positions on the screen. Each of the first and second top menus includes a plurality of operational items.

In dual view display, the first and second top menus may be displayed in the same position on the screen. However, it is preferable that the first and second top menus be displayed in different positions. In one embodiment, when a user touches the touch panel 1b, it is determined, on the basis of the coordinate data of the touch position, to which of the first and second top menus the touch operation is directed, as described below. Thus, the first and second top menus should be displayed in different positions. In this arrangement, it can be determined, without using special techniques such as a sensor that detects the motion of an object, which of a driver and a passenger has touched the touch panel 1b.

Moreover, when different image sources are selected on the side of the driver's seat and the side of the passenger's seat in dual view display, the control unit 3 determines, on the basis of the coordinate data output from the touch-position detecting unit 1c, which of the first and second top menus has been touched, enables operations on a touched top menu, and disables operations on the other top menu that has not been touched.

Moreover, after disabling operations on the other top menu, the control unit 3 controls the warning generating unit 5 so as to output a warning message stating that an operation is invalid upon detecting the operation on the other top menu on the basis of the coordinate data output from the touch-position detecting unit 1c. The warning generating unit 5 outputs, for example, image data of a warning message to the display control unit 2 so as to display the warning message on the display panel 1a.

Figure 2:
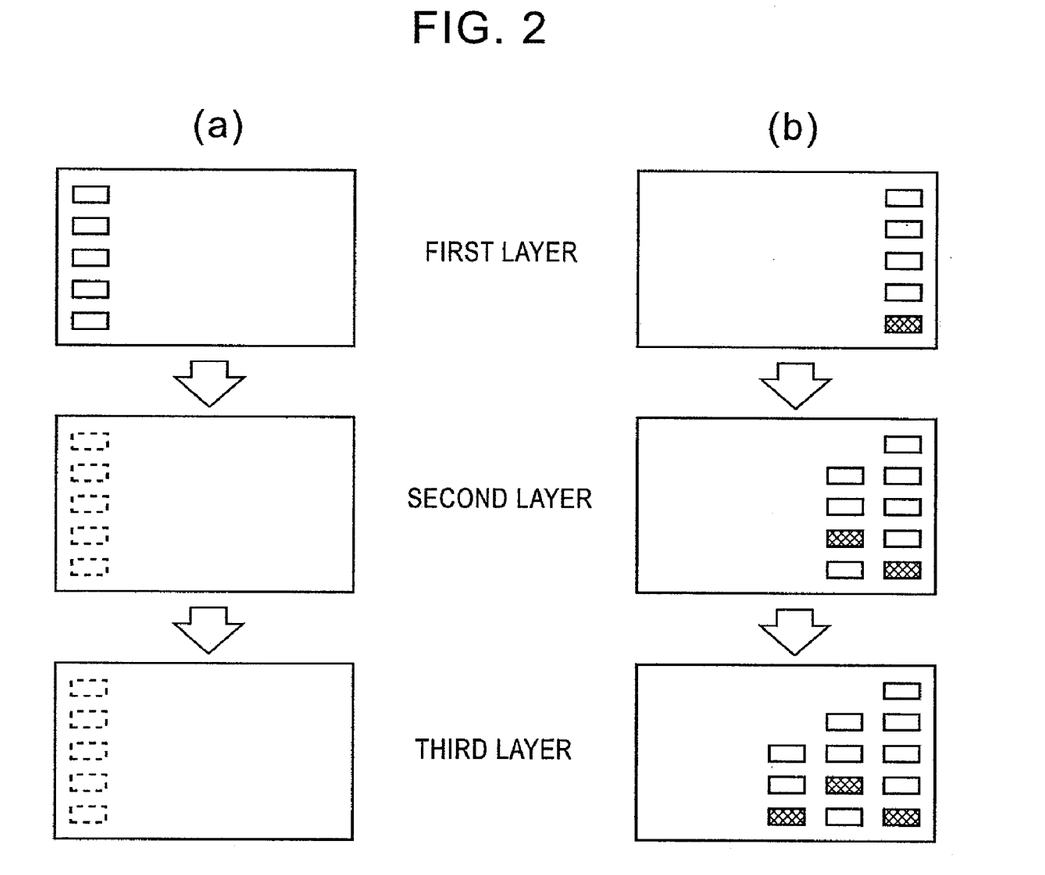
FIG. 2 shows exemplary menu screens that appear on a display panel during dual view display of different image sources in the first embodiment.

FIG. 2 shows exemplary menu screens that may appear on the display panel 1a. Part (a) of FIG. 2 shows a change in a menu screen for the left-side seat in the first to third layers, and Part (b) of FIG. 2 shows a change in a menu screen for the right-side seat in the first to third layers. In the first layer, the screens of the first and second top menus, which are always displayed when the user has not performed any operation on the touch panel 1b, are displayed. In the second and third layers, menu screens in the lower layers that appear when one of the operational items on the first or second top menu is touched are displayed.

The first top menu for independently performing operations on an image for the left-side seat is displayed near the left end of the menu screen for the left-side seat in the first layer, as shown in Part (a) of FIG. 2. When the left-side seat is the passenger's seat, an image for the left-side seat is, for example, a television image or a DVD image, as described above. In this case, the first top menu includes a plurality of operational items for controlling the television image or the DVD image.

In general, operational items on a hierarchical menu are broadly classified into two types: transitional items for moving to the lower or upper layer and functional items for controlling the function or operation of a device subjected to control. At least one functional item is set in the lowermost layer of the hierarchical structure. Transitional items and functional items can be set in the uppermost layer or intermediate layers of the hierarchical structure. Any items of transitional items and functional items can be assigned to the plurality of operational items included in the aforementioned first top menu. For example, when a functional item, such as a button for skipping titles, chapters, or the like, or a volume control button, is assigned to one of the plurality of operational items, the corresponding function can be performed with the touch of a button.

The second top menu for independently performing operations on an image for the right-side seat is displayed near the right end of the menu screen for the right-side seat in the first layer, as shown in Part (b) of FIG. 2. When the right-side seat is the driver's seat, an image for the right-side seat is, for example, a navigation image, as described above. In this case, the second top menu includes a plurality of operational items for controlling the navigation image. Any items of transitional items and functional items can be assigned to the plurality of operational items. For example, when a functional item, such as a button for displaying the current position or a button for changing the display scale, is assigned to one of the plurality of operational items, the corresponding function can be performed with the touch of a button.

In the first layer, all operational items on the first and second top menus are enabled, and a user can perform an operation on a desired item of the operational items by touching the desired item. When one of the operational items has been touched in the first layer, operations on one of the first and second top menus, to which the touched operational item does not belong, are disabled.

A disabled status means a status in which no touch operation is accepted. For example, disabled operational items are displayed on the screen in a status in which the disabled operational items are masked. Alternatively, disabled operational items may not be displayed. Masking operational items means displaying the operational items in a way that is different from a way in which the operational items are displayed when operations on the operational items are enabled, for example, displaying the operational items in a color that is paler than an ordinary color.

FIG. 2 shows a case where a transitional item on the second top menu is touched in the first layer (touched operational items are indicated by hatched lines). In this case, the control unit 3 determines on the basis of the coordinate data output from the touch-position detecting unit 1c that the second top menu has been touched. As the result of the determination, the control unit 3 keeps enabling operations on the second top menu and disables operations on the first top menu.

Specifically, when the control unit 3 has detected a touch on a transitional item on the second top menu, regarding the menu screen for the left-side seat, the control unit 3 controls the display control unit 2 and the menu generating unit 4 so as to mask or not display the first top menu. Moreover, the control unit 3 performs control so as to disable operations on the first top menu even when one of the masked operational items is touched and the coordinate data is supplied from the touch-position detecting unit 1c.

On the other hand, regarding the menu screen for the right-side seat, the control unit 3 controls the display control unit 2 and the menu generating unit 4 so as to display the menu in the second layer on the display panel 1a. When a transitional item on the menu screen for the right-side seat has further been touched in the second layer, the control unit 3 controls the display control unit 2 and the menu generating unit 4 so as to display the menu in the third layer on the display panel 1a. Meanwhile, the disabled status of the first top menu is kept. In this way, until the operation is completed by finally touching a functional item on the menu screen for the right-side seat, on which the second top menu is enabled in the first layer, or it is determined that no coordinate data has been supplied from the touch-position detecting unit 1c for a predetermined period, the disabled status of the operational items on the first top menu is kept.

Since the operational items on the menu screen for the left-side seat are disabled in this way, the operational items on the menu screen for the right-side seat in the second and third layers, on which operations are enabled, can be located in any position on the screen except a position in which the first top menu was displayed in the initial status. In this case, the control unit 3 assumes that all touch operations on the touch panel 1b in the second and third layers are operations on the menu screen for the right-side seat. On the other hand, when one of the operational items on the first top menu is touched in the first layer, the operational items on the menu screen for the right-side seat are disabled. Thus, subsequently, even when the positions of the operational items on the menu screen for the right-side seat are touched in the second and third layers, the control unit 3 assumes that the touch operations are operations on the menu screen for the left-side seat.

Figure 3:
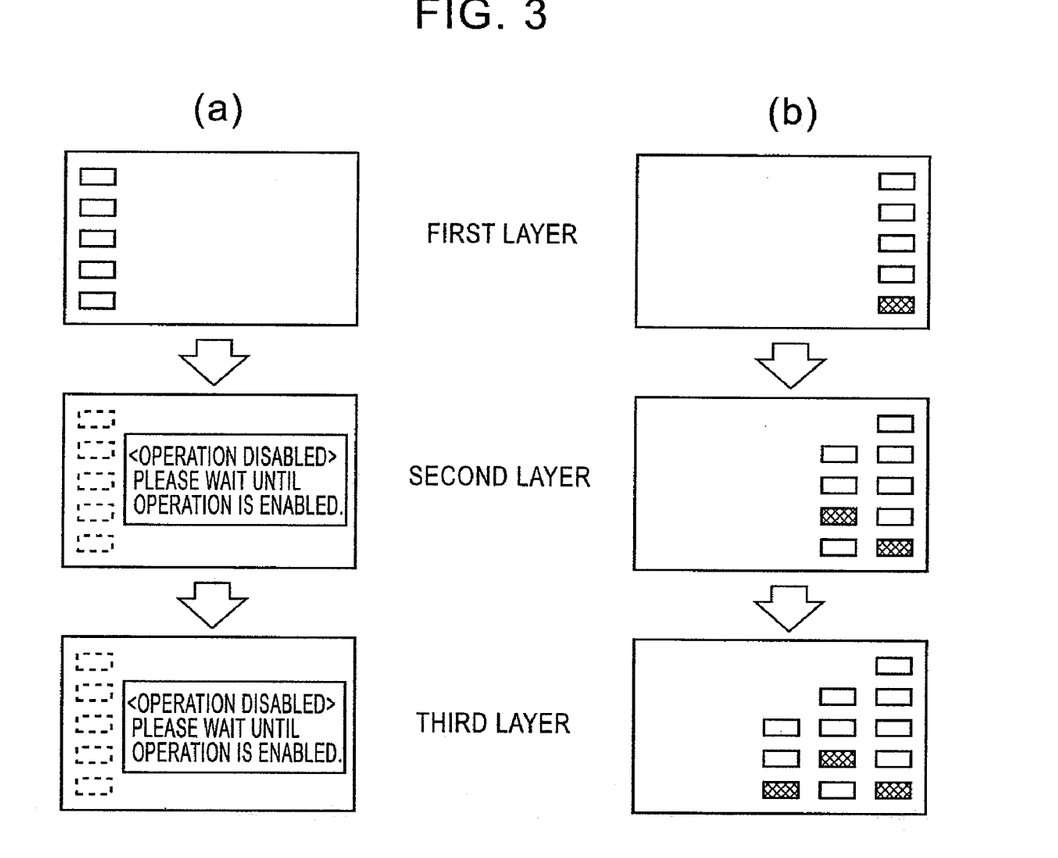
FIG. 3 shows other exemplary menu screens that appear on the display panel during dual view display of different image sources in the first embodiment.

FIG. 3 shows other exemplary menu screens that may appear on the display panel 1a. FIG. 3 shows changes in the menu screens, as in FIG. 2. In this case, exemplary display screens are shown in a case where the menu screen for the left-side seat, which has been disabled, is touched in the second and third layers are shown.

After the control unit 3 disables operations on the first top menu, which has not been touched in the first layer, when the control unit 3 detects, on the basis of the coordinate data output from the touch-position detecting unit 1c, a touch operation on the first top menu, the control unit 3 controls the warning generating unit 5 and the display control unit 2 so as to display a warning message stating that the operation is invalid on the display panel 1a. A case where a warning message is displayed on the display panel 1a is described here. Alternatively, a voice may be output from a speaker (not shown) as a warning.

Figure 4:
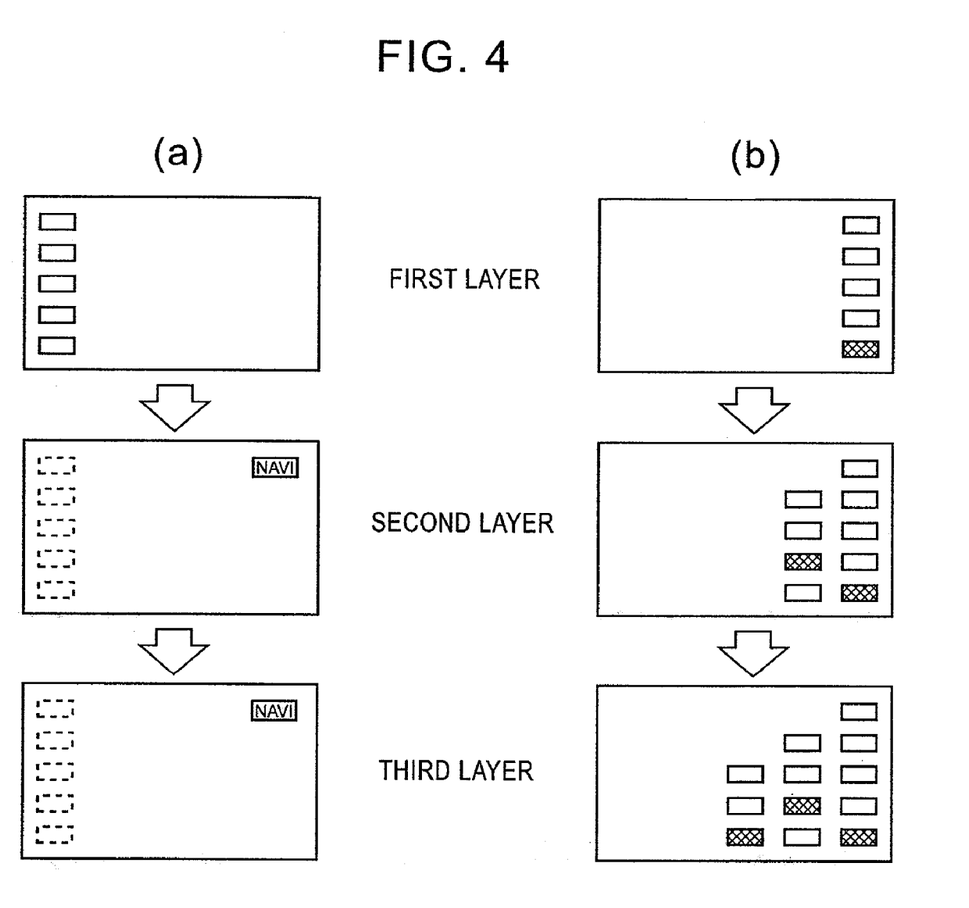
FIG. 4 shows yet other exemplary menu screens that appear on the display panel during dual view display of different image sources in the first embodiment.

FIG. 4 shows yet other exemplary menu screens that may appear on the display panel 1a. FIG. 4 shows changes in the menu screens, as in FIG. 2. In this case, exemplary display screens are shown in a case where the operation mode of a menu screen is displayed on a part of the other menu screen on which operations have been disabled.

In this case, when the control unit 3 disables operations on the first top menu, which has not been touched in the first layer, the control unit 3 controls the display control unit 2 so as to display the type of an image on which operations are enabled as a message on the other image on which operations are disabled. Specifically, a message stating that an image on the menu screen for the right-side seat subjected to an operation is a navigation image is displayed in a predetermined position (the upper right of the screen in FIG. 4) on the menu screen for the left-side seat.

Figure 5:
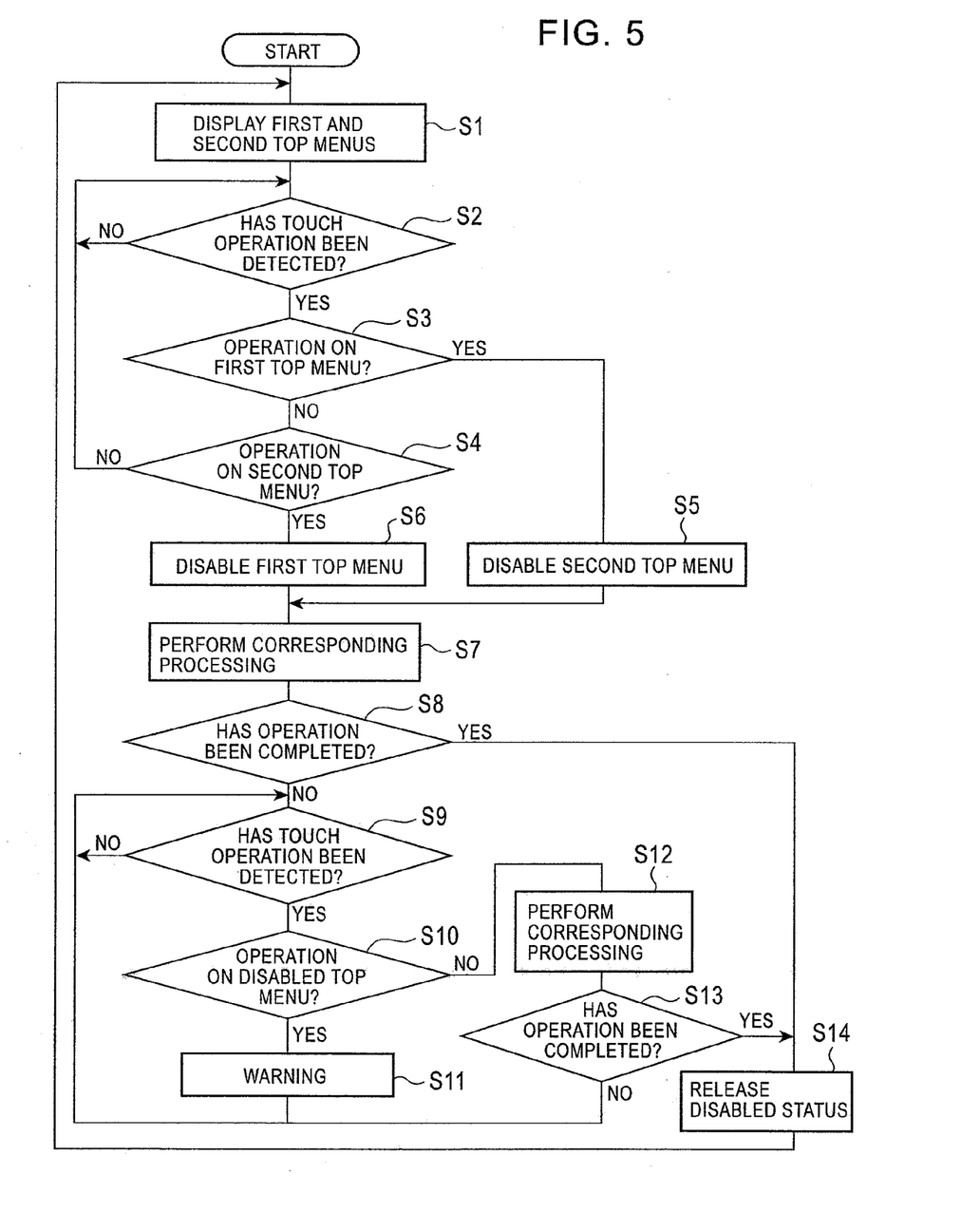
FIG. 5 is a flowchart showing an exemplary operation of the display device according to the first embodiment.

FIG. 5 is a flowchart showing an exemplary operation of the display device 10 according to the first embodiment having the aforementioned configuration. In step S1, the control unit 3 controls the display control unit 2 and the menu generating unit 4 to provide dual view display of different image sources on the side of the driver's seat and the side of the passenger's seat on the display panel 1a, and to display the first and second top menus on the display panel 1a, as in the first layer shown in FIG. 2.

Then, in step S2, the control unit 3 determines, on the basis of whether coordinate data has been output from the touch-position detecting unit 1c, whether the touch panel 1b has been touched. The determination is repeated until the touch panel 1b is touched. When the control unit 3 determines, on the basis of coordinate data output from the touch-position detecting unit 1c, that the touch panel 1b has been touched, the process proceeds to step S3. In steps S3 and S4, the control unit 3 determines, on the basis of the coordinate data of the touch position, which of the first and second top menus has been touched.

When the control unit 3 determines that the first top menu has been touched, the process proceeds to step S5 where the control unit 3 disables operations on the second top menu. Meanwhile, operations on the first top menu are enabled. On the other hand, when the control unit 3 determines that the second top menu has been touched, the process proceeds to step S6 where the control unit 3 disables operations on the first top menu. Meanwhile, operations on the second top menu are enabled. After the process in step S5 or S6 is performed, the operation mode of a menu screen may be displayed on the other menu screen on which operations have been disabled, as shown in FIG. 4.

When the operation on the touch panel 1b detected in step S2 is performed on neither the first nor second top menu, i.e., when the coordinate data input from the touch-position detecting unit 1c to the control unit 3 represents neither coordinates that indicate the position of the first top menu nor coordinates that indicate the position of the second top menu, the touch operation is invalid. Thus, the process goes back to step S2.

After the process in step S5 or S6 is performed, in step S7, the control unit 3 performs control so that processing corresponding to a touched operational item is performed. When the touched operational item is a transitional item, the control unit 3 controls the display control unit 2 and the menu generating unit 4 so as to display a menu image in a transition target layer on the display panel 1a. When the touched operational item is a functional item, the control unit 3 controls a device (not shown) subjected to control so as to perform the corresponding function or operation.

Then, in step S8, the control unit 3 determines whether a series of operations has been completed. Specifically, the control unit 3 determines whether a functional item has been touched and processing corresponding to the functional item has been performed. When a functional item has been touched and when the processing in step S7 has been performed, the process proceeds to step S14. In step S14, operations on the top menu disabled in step S5 or S6 are enabled. Then, the process goes back to step S1. On the other hand, when a transitional item has been touched and when the processing in step S7 has been performed, the process proceeds to step S9 because subsequent operations exist.

In step S9, the control unit 3 determines, on the basis of whether coordinate data has been output from the touch-position detecting unit 1c, whether the touch panel 1b has been touched. The determination is repeated until the touch panel 1b is touched. In this case, a period between the time when a touch operation on the touch panel 1b is detected in step S2 and the time when another touch operation is detected in step S9 may be measured. Then, when another touch operation has not been detected in step S9 for a predetermined period (i.e., when a time-out has occurred), it may be determined that the user will not continue the operation, and the process may go back to step S1.

When the control unit 3 determines, on the basis of coordinate data output from the touch-position detecting unit 1c, that the touch panel 1b has been touched, the process proceeds to step S10. In step S10, the control unit 3 determines, on the basis of the coordinate data of the touch position, whether the operation is directed to the disabled top menu. When the operation is directed to the disabled top menu, the process proceeds to step S11. In step S11, a warning message is output, as shown in FIG. 3, and the process goes back to step S9.

On the other hand, when the operation is not directed to the disabled top menu, i.e., when the operation is directed to a sub-menu of the enabled top menu in the lower layer, the process proceeds to step S12 where the control unit 3 performs control so that processing corresponding to a touched operational item is performed. When the touched operational item is a transitional item, the control unit 3 controls the display control unit 2 and the menu generating unit 4 so as to display a menu image in a transition target layer on the display panel 1a. When the touched operational item is a functional item, the control unit 3 controls the device (not shown) subjected to control so as to perform the corresponding function or operation.

Then, in step S13, the control unit 3 determines whether a series of operations has been completed. Specifically, the control unit 3 determines whether a functional item has been touched and processing corresponding to the functional item has been performed. When a transitional item has been touched and when the processing in step S12 has been performed, the process goes back to step S9 because subsequent operations exist. After a transitional item is touched, when another touch operation has not been detected for a predetermined period, it may be determined that the user will not continue the operation, and the process may go back to step S1. On the other hand, when a functional item has been touched and when the processing in step S12 has been performed, the process proceeds to step S14. In step S14, operations on the top menu disabled in step S5 or S6 are enabled. Then, the process goes back to step S1.

In the first embodiment, the first top menu for a passenger and the second top menu for a driver are displayed in different positions on the screen, and it is determined, on the basis of the coordinate data of a touch position, on which of the top menus an operation has been performed, as described above. Thus, special techniques, such as those implementing a sensor, need not be used, and independent operations by a passenger and a driver can be achieved at a low cost.

Moreover, in the first embodiment, before a user touches the touch panel 1b, the first and second top menus are displayed in advance. Thus, an unnecessary touch operation for displaying the top menus need not be performed. Moreover, each of the top menus includes a plurality of operational items. Thus, for example, when functions that are supposed to be frequently used are assigned to the operational items, a desired function can be performed by the touch of a corresponding operational item. Accordingly, the menu operation can be performed by a smaller number of touches, thereby achieving excellent operability.

For example, when the first top menu on the menu screen for the left-side seat is disabled, operational items on the menu screen for the right-side seat, on which operations are disabled, in the lower layers are displayed in a position other than a position in which the first top menu was displayed in the initial status. However, the present invention is not limited to this embodiment. Alternatively, for example, the operational items on the menu screen for the right-side seat in the lower layers may be displayed in any position on the screen including the position in which the first top menu was displayed in the initial status. In this case, only in a case where the operational items on the menu screen for the right-side seat in the lower layers are not displayed in the position of the first top menu, the warning generating unit 5 outputs a warning when the position of the first top menu has been touched.

Second Embodiment

A second embodiment relates to a method for providing menu images when the same image source is selected on the side of the driver's seat and the side of the passenger's seat in dual view display. The structure of the display device 10 in the second embodiment is similar to that shown in FIG. 1. However, the second embodiment is different from the first embodiment in the operations of the display control unit 2, the control unit 3, and the menu generating unit 4.

Figure 6:
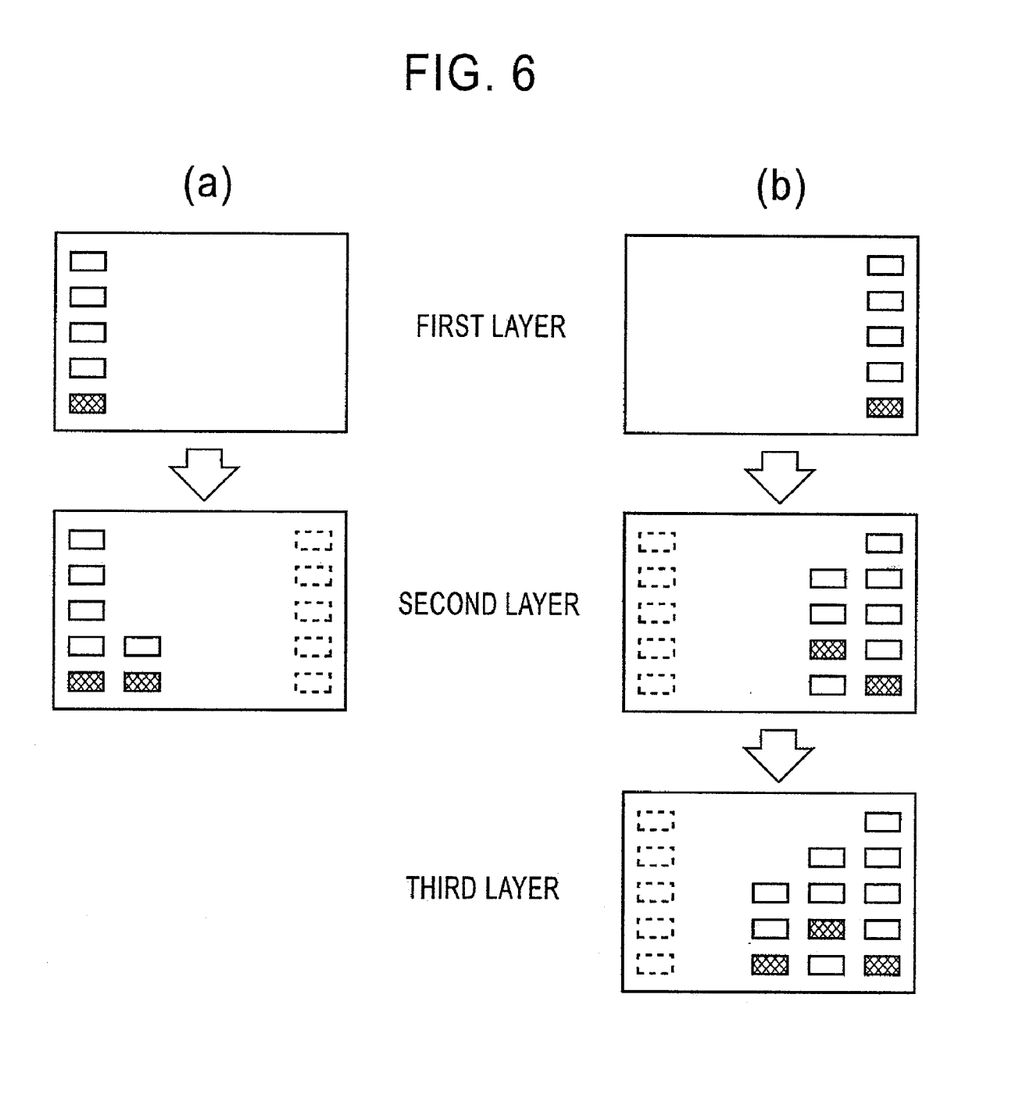
FIG. 6 shows exemplary menu screens that appear on the display panel during dual view display of the same image source in a second embodiment.

FIG. 6 shows exemplary menu screens that may appear on the display panel 1a when the same image source is selected on the side of the driver's seat and the side of the passenger's seat in dual view display. Part (a) of FIG. 6 shows a change in the menu screen for the left-side seat in the first to second layers (it is assumed that all operational items in the second layer are functional items, and the menu screen for the left-side seat does not exist in the third layer), and Part (b) of FIG. 6 shows a change in the menu screen for the right-side seat in the first to third layers.

In the first layer, the screens of the first and second top menus, which are displayed when the user has not performed any operation on the touch panel 1b, are displayed. In the second and third layers, menus in the lower layers that appear when one of the operational items on the first or second top menu is touched are displayed.

The first top menu is displayed near the left end of the menu screen for the left-side seat in the first layer, as shown in Part (a) of FIG. 6. The second top menu is displayed near the right end of the menu screen for the right-side seat in the first layer, as shown in Part (b) of FIG. 6. In this case, the first and second top menus are menus for independently performing operations on the same image and have the same content.

In the first layer, all operational items on the first and second top menus are enabled, and a user can perform an operation on a desired item of the operational items by touching the desired item. When one of the operational items has been touched in the first layer, operations on one of the first and second top menus, to which the touched operational item does not belong, are disabled. The disabling operation is similar to that described in the first embodiment.

For example, when a transitional item on the first top menu has been touched in the first layer, a menu for the left-side seat in the second layer is displayed, as shown in Part (a) of FIG. 6. Meanwhile, the second top menu is disabled in the second layer. On the other hand, when a transitional item on the second top menu has been touched in the first layer, a menu for the right-side seat in the second layer is displayed, as shown in Part (b) of FIG. 6. Meanwhile, the first top menu is disabled in the second layer.

Comparing the second layers in Parts (a) and (b) of FIG. 6 shows that, even though transitional items having the same content are touched in the first layer, pieces of content of the menus displayed in the second layer are different from each other. That is to say, in the second embodiment, the control unit 3 determines, on the basis of coordinate data output from the touch-position detecting unit 1c, which of the first and second top menus has been touched, and controls the display control unit 2 and the menu generating unit 4 so as to display a menu in the lower layer corresponding to the touched top menu on the display panel 1a. The number, functions, display colors, display positions, and the like of operational items vary with the menu in the lower layer.

For example, when the display device 10 is used as an in-vehicle device, a detailed operation menu may be displayed for a driver so that the driver can perform detailed operations, and a simplified operation menu may be displayed for a passenger so that the passenger can perform basic operations (and vice versa). Moreover, a default menu may be displayed for a passenger, and a custom menu may be displayed for a driver, operational items to be displayed on the custom menu, the display position of the custom menu, and the like being customized by the driver in advance.

Figure 7:
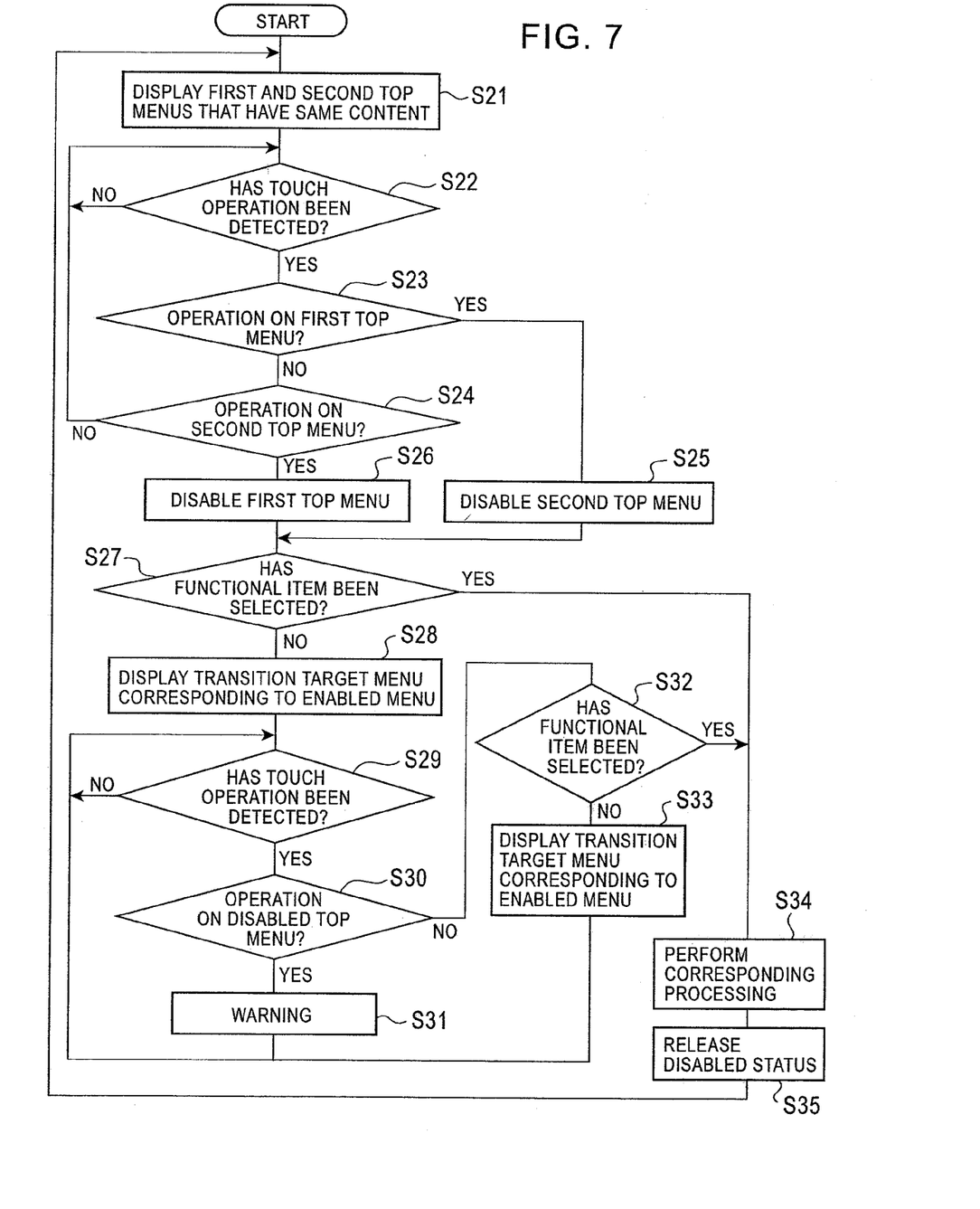
FIG. 7 is a flowchart showing an exemplary operation of the display device according to the second embodiment.

FIG. 7 is a flowchart showing an exemplary operation of the display device 10 according to the second embodiment. In step S21, the control unit 3 controls the display control unit 2 and the menu generating unit 4 so as to provide dual view display of the same image source on the side of the driver's seat and the side of the passenger's seat on the display panel 1a and display the first and second top menus having the same content on the display panel 1a, as in the first layer shown in FIG. 6.

Then, in step S22, the control unit 3 determines, on the basis of whether coordinate data has been output from the touch-position detecting unit 1c, whether the touch panel 1b has been touched. The determination is repeated until the touch panel 1b is touched. When the control unit 3 determines, on the basis of coordinate data output from the touch-position detecting unit 1c, that the touch panel 1b has been touched, the process proceeds to step S23. In steps S23 and S24, the control unit 3 determines, on the basis of the coordinate data of the touch position, which of the first and second top menus has been touched.

When the control unit 3 determines that the first top menu has been touched, the process proceeds to step S25 where the control unit 3 disables operations on the second top menu. Meanwhile, operations on the first top menu are enabled. On the other hand, when the control unit 3 determines that the second top menu has been touched, the process proceeds to step S26 where the control unit 3 disables operations on the first top menu. Meanwhile, operations on the second top menu are enabled.

When the operation on the touch panel 1b detected in step S22 is performed on neither the first nor second top menu, i.e., when the coordinate data input from the touch-position detecting unit 1c to the control unit 3 represents neither coordinates that indicate the position of the first top menu nor coordinates that indicate the position of the second top menu, the touch operation is invalid. Thus, the process goes back to step S22.

After the process in step S25 or S26 is performed, in step S27, the control unit 3 determines whether a touched operational item is a functional item. When the control unit 3 determines that the touched operational item is a functional item, the process proceeds to step S34. In step S34, the control unit 3 controls the device (not shown) subjected to control so as to perform the corresponding function or operation. Then, in step S35, the control unit 3 enables operations on the top menu disabled in step S25 or S26, and the process goes back to step S21.

On the other hand, when the touched operational item is not a functional item, i.e., when the touched operational item is a transitional item, the process proceeds to step S28. In step S28, the control unit 3 controls the display control unit 2 and the menu generating unit 4 so as to display a menu image in a transition target layer on the display panel 1a. The menu image in the transition target layer corresponds to the enabled top menu. For example, when the first top menu is disabled in step S26, a detailed operation menu to which the enabled second top menu moves may be displayed on the display panel 1a. When the second top menu is disabled in step S25, a simplified operation menu to which the enabled first top menu moves may be displayed on the display panel 1a.

Then, in step S29, the control unit 3 determines, on the basis of whether coordinate data has been output from the touch-position detecting unit 1c, whether the touch panel 1b has been touched. The determination is repeated until the touch panel 1b is touched. In this case, a period between the time when a touch operation on the touch panel 1b is detected in step S22 and the time when another touch operation is detected in step S29 may be measured. Then, when another touch operation has not been detected in step S29 for a predetermined period (i.e., when a time-out has occurred), it may be determined that the user will not continue the operation, and the process may go back to step S21.

When the control unit 3 determines, on the basis of coordinate data output from the touch-position detecting unit 1c, that the touch panel 1b has been touched, the process proceeds to step S30. In step S30, the control unit 3 determines, on the basis of the coordinate data of the touch position, whether the operation is directed to the disabled top menu. When the operation is directed to the disabled top menu, the process proceeds to step S31. In step S31, a warning message is output, as shown in FIG. 3, and the process goes back to step S29.

On the other hand, when the operation is not directed to the disabled top menu, i.e., when the operation is directed to the enabled top menu, the process proceeds to step S32. In step S32, the control unit 3 determines whether a touched operational item is a functional item. When the touched operational item is not a functional item, i.e., when the touched operational item is a transitional item, the process proceeds to step S33. In step S33, the control unit 3 controls the display control unit 2 and the menu generating unit 4 so as to display a menu image in a transition target layer on the display panel 1a, and the process goes back to step S29. The menu image in the transition target layer corresponds to the enabled top menu. After a transitional item is touched and the menu in the transition target layer is displayed, when another touch operation has not been detected for a predetermine period, it may be determined that the user will not continue the operation, and the process may go back to step S21.

When the control unit 3 determines in step S32 that the touched operational item is a functional item, the process proceeds to step S34. In step S34, the control unit 3 controls the device (not shown) subjected to control so as to perform the corresponding function or operation. Then, in step S35, the control unit 3 enables operations on the top menu disabled in step S25 or S26, and the process goes back to step S21.

For example, in a case where the display device 10 is used as an in-vehicle display device, during dual view display in which the same image source is selected on the side of the driver's seat and the side of the passenger's seat, different menus can be displayed for a driver and a passenger even in an image from the same source, as described above. Thus, the operability can be improved by providing a menu suitable for a user.

In the first and second embodiments, the top menus are displayed near the left and right ends of the screen. However, this is just an example. The first and second top menus may be displayed in any positions on the screen as far as the positions of these top menus are different from each other.

The aforementioned embodiments are just exemplary embodiments of the present invention and are not to be considered to limit the technical scope of the present invention. That is to say, the present invention can be embodied in various types of form without departing from the spirit or main characteristic features of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. A display device comprising:
  a display unit that provides dual view display of an image;
  a touch detecting unit that detects a touch operation on the display unit;
  a touch-position detecting unit that detects a position of a touch on the touch detecting unit and outputs coordinate data of the position;
  a display control unit that causes the display unit to provide dual view display of an image and display a menu image;
  a menu generating unit that generates first and second top menus for independently performing operations on a plurality of images subjected to dual view display, each of the first and second top menus including a plurality of operational items; and
  a control unit that performs control to display the first and second top menus in different positions on a screen of the display unit, the first top menu corresponding to a first coordinate data area and the second top menu corresponding to a second coordinate data area, wherein the control unit determines, based on whether a coordinate data of a touch detected by the touch-position detecting unit corresponds to the first coordinate data area or the second coordinate data area, which of the first and second top menus has been touched, and wherein the control unit enables operations on the one of the first and second top menus that has been touched, and disables operations on the other one of the first and second top menus that has not been touched.

2. The display device according to claim 1, wherein the control unit controls the menu generating unit and the display control unit to display a sub-menu corresponding to the one of the first and second top menus on the display unit that has been touched.

3. The display device according to claim 1, wherein, after operations on the other one of the first and second top menus are disabled, the control unit performs control so that, when the control unit has detected an operation on the other one of the first and second top menus on the basis of the coordinate data from the touch-position detecting unit, a message stating that the operation is invalid is output.

4. The display device according to claim 1, wherein, when operations on the other one of the first and second top menus are disabled, the control unit controls the display control unit to display a type of an image on which operations are enabled as a message on the other image on which operations are disabled.

5. The display device according to claim 1, wherein, when dual view display of an image from the same image source is provided on the display unit, the menu generating unit generates the first and second top menus having the same content for independently performing operations on the same image source subjected to dual view display, each of the first and second top menus including a plurality of operational items, and the control unit performs control to display the first and second top menus in different positions on the screen of the display unit, the first top menu corresponding to the first coordinate data area and the second top menu corresponding to the second coordinate data area, wherein the control unit determines, based on whether the coordinate data of the touch detected by the touch-position detecting unit corresponds to the first coordinate data area or the second coordinate data area, which of the first and second top menus has been touched, and wherein the control unit controls the menu generating unit and the display control unit to display a sub-menu that depends on one of the first and second top menus that has been touched on the display unit.

6. A user interface of a display device comprising:
a display control unit that performs control to display first and second top menus for independently performing operations on a plurality of images subjected to dual view display on a display unit provided with a touch panel, each of the first and second top menus including a plurality of operational items; and
a control unit that performs control to determine, on the basis of coordinate data of a position of a touch detected by the touch panel, which of the first and second top menus has been touched, and to enable operations on one of the first and second top menus that has been touched, and to disable operations on the other one of the first and second top menus that has not been touched.

7. The user interface of the display device according to claim 6, wherein the control unit controls the display control unit to display a sub-menu corresponding to the one of the first and second top menus that was touched on the display unit provided with the touch panel.

8. The user interface of the display device according to claim 6, wherein, after operations on the other one of the first and second top menus are disabled, the control unit performs control so that, when the control unit has detected an operation on the other one of the first and second top menus on the basis of coordinate data of a position of a touch detected by the touch panel, a message stating that the operation is invalid is output.

9. The user interface of the display device according to claim 8, wherein the control unit controls the display control unit to display the message stating that the operation is invalid on an image on which operations are disabled.

10. The user interface of the display device according to claim 8, wherein the control unit performs control so that the message stating that the operation is invalid is output as a voice.

11. The user interface of the display device according to claim 6, wherein, when operations on the other one of the first and second top menus are disabled, the control unit controls the display control unit to display a type of an image on which operations are enabled as a message on the other image on which operations are disabled.

12. A user interface of a display device comprising:
a display control unit that performs control to provide dual view display of an image from the same image source and display first and second top menus having the same content for independently performing operations on the same image source subjected to dual view display in different positions on a screen of a display unit provided with a touch panel, the first top menu corresponding to a first coordinate data area of the display unit and the second top menu corresponding to a second coordinate data area of the display unit, each of the first and second top menus including a plurality of operational items; and
a control unit that determines, based on whether a touch detected by the touch panel corresponds to the first coordinate data area or the second coordinate data area, which of the first and second top menus has been touched, and controls the display control unit to display a sub-menu that depends on one of the first and second top menus that has been touched on the display unit provided with the touch panel.

13. A method for providing menus, the method comprising:
displaying, on a display unit provided with a touch panel, first and second top menus for independently performing operations on a plurality of images that are subjected to dual view display and displaying on the display unit provided with the touch panel, each of the first and second top menus including a plurality of operational items;
determining, on the basis of coordinate data of a position of a touch detected by the touch panel, which of the first and second top menus has been touched;
enabling operations on one of the first and second top menus that has been touched and disabling operations on the other one of the first and second top menus that has not been touched based on the determination of which of the first and second top menus has been touched; and
determining which operational item on the one of the first and second top menus has been touched and displaying a sub-menu corresponding to the touched operational item on the display unit provided with the touch panel based on the coordinate data of the position of the touch detected by the touch panel.

14. The method according to claim 13, further comprising:

after operations on the other one of the first and second top menus are disabled, outputting a message stating that an operation is invalid when the operation on the other one of the first and second top menus has been detected on the basis of coordinate data of a position of a touch detected by the touch panel.

15. The method according to claim 13, further comprising:

displaying a type of an image on which operations are enabled as a message on the other image on which operations are disabled when operations on the other one of the first and second tope menus are disabled.

16. The method according to claim 13, wherein, during dual view display of an image from the same image source, the first and second top menus having the same content for independently performing operations on the same image source subjected to dual view display are displayed in different positions on a screen of the display unit provided with the touch panel, each of the first and second top menus including a plurality of operational items, the first top menu corresponding to a first coordinate data area of the display unit and the second top menu corresponding to a second coordinate data area of the display unit, and wherein the act of determining which operational item on the one of the first and second top menus has been touched and displaying a sub-menu corresponding to the touched operational item on the display unit provided with the touch panel comprises displaying a sub-menu corresponding to the one of the first and second top menus on the display unit provided with the touch panel based on whether the coordinate data of the touch detected by the touch panel corresponds to the first coordinate data area or the second coordinate data area.

* * * * *